C. S. PHILLIPS.
VENTILATED COOKING VESSEL COVER.
APPLICATION FILED JUNE 30, 1908.
941,041.
Patented Nov. 23, 1909.
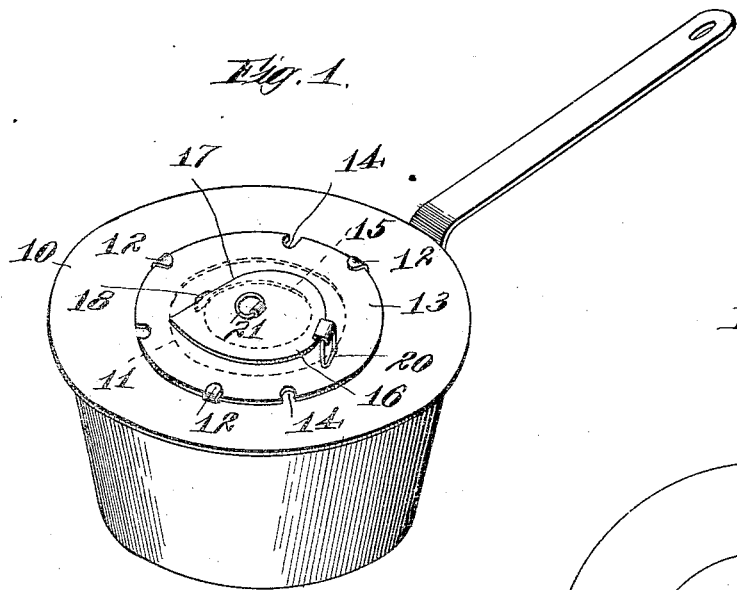
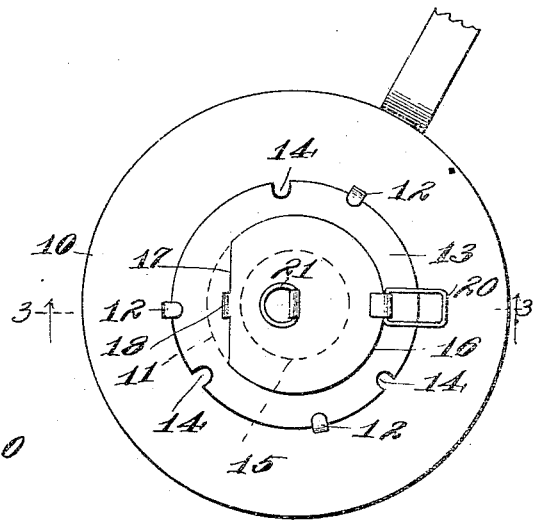
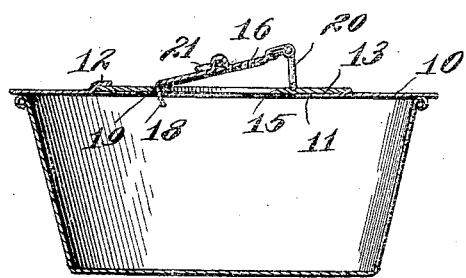
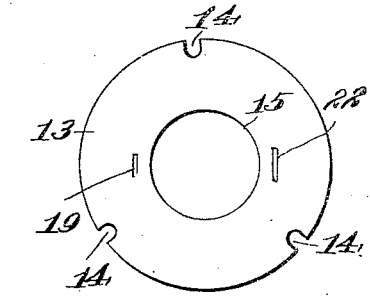
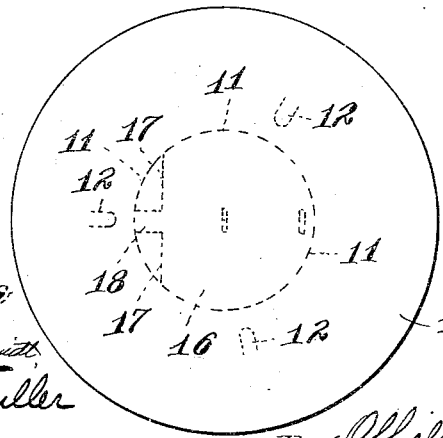
Witnesses:
G. A. Raubenschmidt
Walter M. Fuller
Inventor
Charles S. Phillips
By Offield, Towle & Linthicum
Attys

UNITED STATES PATENT OFFICE.

CHARLES S. PHILLIPS, OF CHICAGO, ILLINOIS.

VENTILATED COOKING-VESSEL COVER.

941,041.  Specification of Letters Patent.  Patented Nov. 23, 1909.

Application filed June 30, 1908.  Serial No. 441,123.

*To all whom it may concern:*

Be it known that I, CHARLES S. PHILLIPS, a citizen of the United States, residing at Chicago, in the county of Cook and State of Illinois, have invented certain new and useful Improvements in Ventilated Cooking-Vessel Covers, of which the following is a specification.

My invention pertains to covers for cooking-vessels, its main and chief object and aim being to provide a cover of this type which may substantially tightly close the vessel on which it is used, or which may permit the external air to have entrance to the interior of the vessel, or the moisture or steam in the vessel to escape into the outer air. In other words, my invention concerns ventilated cooking-vessel covers. In frying meats and the like the food does not readily brown unless the moisture of the same is permitted to escape from the frying-pan or skillet, so that ordinarily the same is not covered, and when thus uncovered the hot grease and fat spatter and fly in all directions, as is well known, both to the danger of the cook and the damaging of the walls and furnishings in the room. My improved cover permits the moisture to escape, and hence allows the cooking food to become brown and seared over, and at the same time it effectually eliminates the possibility of the hot grease from escaping from the frying-pan. Furthermore, the parts of the cover are so constructed as to size, shape, &c., that the complete covers may be manufactured from a minimum quantity of sheet-metal.

In connection with the following description, attention is directed to the accompanying drawing forming a part of this specification, whereon I have illustrated a preferred and desirable embodiment of this invention.

On the drawing,—Figure 1 is a perspective view of a cooking-vessel provided with one of my improved covers; Fig. 2 is a fragmentary plan-view of the construction shown in Fig. 1, the lid of the cover being in lowered position; Fig. 3 is a section on line 3—3 of Fig. 2, and indicates the smaller cover or lid in raised or elevated position; Fig. 4 illustrates a blank of sheet-metal from which certain parts of the cover are cut; and Fig. 5 represents the intermediate cover forming a part of the complete cover.

The entire cover includes a circular metallic plate or ring 10 centrally and circularly apertured at 11, and having upstanding from its top face a plurality of tongues or fingers 12 outside of the aperture and adapted to hold in place an apertured disk 13 notched on its edge at 14 and provided with a concentric hole 15 disposed over and smaller than the other hole or aperture 11. Over the hole 15 I provide a lid or supplemental cover 16 of the same diameter as the hole 11, this lid or supplemental cover being made from a circular disk punched out of the plate 10 to provide the hole or aperture 11. At its back this lid or cover 16 has a straight edge 17, at the central portion of which is a downwardly-turned tongue 18 adapted to fit in a correspondingly shaped slot 19 through the part or disk 13. Hinged to its opposite edge this lid or cover is equipped with a wire loop or support 20, and at the center of the top of this lid I supply the same with a small lifting handle or loop 21. It will therefore be apparent that my complete cover comprises three superposed parts, the apertures of two of which are in register, while the third, which constitutes the lid, is adapted to open and close these registering apertures.

When it is desired to use this combination cover to substantially tightly close the vessel on which it is used, the lid or supplemental cover 16 is allowed to lie flat on the intermediate disk 13, as indicated in Fig. 2; and when it is desired to use this cover as a ventilated cover, that is, when used to permit the escape of moisture from the interior of the vessel, the central lid 16 is raised until the supporting loop 20 can be placed in vertical position, as shown in Fig. 3, with its lower end resting in an indentation or depression 22 provided on the part 13. Then the moisture from the interior of the vessel or frying-pan can escape, but, owing to the fact that this lid or cover is considerably larger than the aperture which it may close, although there may be a considerable spattering or flying of grease or hot fat in the vessel, it cannot escape through this cover. Consequently, a browning or searing over of the contents of a frying-pan may be readily accomplished without danger to the cook or soiling of the stove or other furnishings of the room.

In some cases it is desirable to employ such a cover on a vessel in which boiling water is used, and when it is desired for the contents of the vessel to boil slowly the lid or supplemental cover may be raised to the position shown in Fig. 3, and under such conditions the greater portion of the steam striking the under surface of this lid is condensed and drips back into the vessel, whereby there is but small likelihood of the vessel boiling dry.

Especial attention is directed to the fact that the central small lid readily turns on its hinge connection with the intermediate disk or plate 13, and this lid is readily detached from the cover by merely lifting the same bodily and shifting it slightly rearwardly at the same time, so that all parts of the cover may be readily washed and maintained in sanitary condition.

It is further to be noted that a minimum of sheet-metal is employed in the manufacture of this cover, for the reason that the smaller lid 16 is made from the refuse or disk punched out of the center of the plate 10.

The housekeeper, if desired, may have a plurality of plates 10 of varying sizes to fit different vessels, and need have but a single disk or plate 13 and cover 16, because these may be readily detached from the plate or ring 10 by turning the disk 13 so as to bring the notches 14 into register with the fingers 12, whereupon the disk 13, by lifting, may be wholly detached, as is obvious. Its replacement on this plate 10, or any other of different size, may be accomplished, as will be readily understood, by bringing the notches or recesses 14 opposite the fingers 12, whereupon, by lowering the disk 13 and turning it angularly, it becomes securely held in position by these fingers. Preferably, these fingers or prongs 12 are rounded and have comparatively smooth edges, so that in washing or handling there is practically no tendency to tear the wash-cloth or injure the hands.

Although I have set forth with some degree of particularity the construction of this improved cover, it is nevertheless to be understood that this invention is not limited and restricted to the precise structural features shown, since these may be changed to a considerable extent without sacrificing any of the advantages and benefits of the invention, and without departure from the substance thereof.

I claim:

1. In a ventilated cooking-vessel cover, the combination of a main apertured cover, an intermediate cover detachably secured to said main cover and having an aperture smaller than and registering with the aperture of said main cover, a supplemental lid of substantially the same diameter as the aperture in said main cover, detachably hinged to said intermediate cover and adapted to open and close its aperture and means to maintain said supplemental lid elevated above said aperture to permit ventilation of the vessel and in such position as to prevent escape of the flying contents of the vessel, substantially as described.

2. In a ventilated cooking-vessel cover, the combination of a main apertured cover having a plurality of fingers, an intermediate apertured cover having its periphery notched, whereby said intermediate cover may be detachably held on said main cover by said fingers, the aperture of said intermediate cover registering with that of the main cover, a supplemental lid of substantially the same diameter as the aperture in said main cover, detachably hinged to said intermediate cover and adapted to open and close said aperture and means to hold said supplemental lid in elevated position above said aperture to permit ventilation of said vessel, substantially as described.

CHARLES S. PHILLIPS.

Witnesses:
WALTER M. FULLER,
CLARE L. ROSENOW.